United States Patent Office 3,184,473
Patented May 18, 1965

3,184,473
IMIDAZOLINE DERIVATIVES
Graham John Durant, Welwyn Garden City, England, assignor to Smith Kline & French Laboratories, Philadelphia, Pa., a corporation of Pennsylvania
No Drawing. Filed May 6, 1963, Ser. No. 278,423
Claims priority, application Great Britain, May 14, 1962, 18,469/62
3 Claims. (Cl. 260—309.6)

This invention relates to new imidazoline derivatives having pharmacodynamic activity. In particular the compounds of this invention have anti-inflammatory activity.

The new imidazolines of this invention are represented by the following formula:

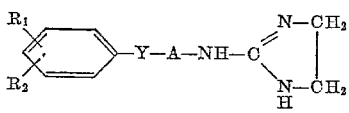

when:
Y is oxygen or sulfur;
A is an alkylene chain of 2 to 4 carbon atoms having at least 2 carbon atoms separating the hetero atoms to which it is attached; and
$R_1$ and $R_2$ are hydrogen, halogen, lower alkyl or alkoxy.

Preferred compounds of this invention are represented by the following formula:

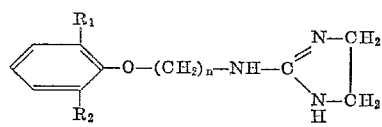

when:
$R_1$ and $R_2$ is lower alkyl, and
$n$ is an integer of from 2 to 4.

An advantageous compound of this invention is 2-(2,6-xylyloxyethylamino)-2-imidazoline.

The terms "lower alkyl" and "lower alkoxy" where used herein denote groups having 1–4 carbon atoms, preferably 1–2 carbon atoms.

This invention also includes pharmaceutically acceptable acid addition salts of the above defined bases formed with organic or inorganic acids. Suitable organic acids are, for example, maleic, fumaric, ascorbic, acetic, citric, methane sulfonic, ethane disulfonic and benzene sulfonic. Exemplary of the preferred inorganic salts are those with hydrochloric, hydrobromic, hydriodic, phosphoric and sulfuric acids. According to the procedure described herein the compounds of this invention are isolated in the form of their inorganic acid addition salts. A salt can be converted into the free base by treatment of a solution of the salt in ethanol with an equimolar amount of a base such as sodium ethoxide or sodium carbonate. The free base can be converted into other pharmaceutically acceptable, acid addition salts by treatment with an alcoholic or ethereal solution of the appropriate organic or inorganic acid.

The imidazoline derivatives of this invention are prepared according to the following procedure:

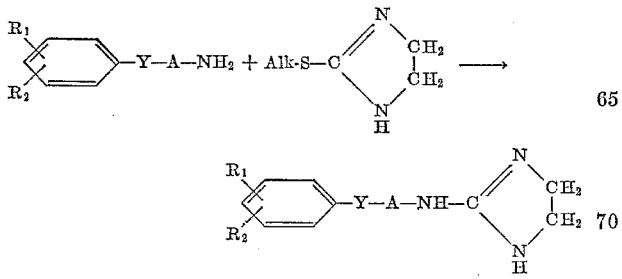

The terms Y, A, $R_1$ and $R_2$ are as defined hereabove and Alk is a lower alkyl group, preferably methyl.

The phenoxyalkylamines or phenylthioalkylamines are reacted with a 2-alkylthio-2-imidazoline preferably as the mineral acid salt such as the hydriodide salt. The reaction is conveniently carried out in an inert organic solvent such as a lower alkanol, for example ethanol or methanol, at elevated temperature conveniently at the reflux temperature for about 1–8 hours, preferably 2–4 hours. The mineral acid salt of the 2-phenoxy (or phenylthio) alkylamino-2-imidazoline is isolated and may be converted to the free base by the procedure described hereabove.

The phenoxyalkylamine and phenylthioalkylamine starting materials are either known to the art or are prepared by the following methods.

A phenol or thiophenol is reacted with chloroacetonitrile in the presence of a base such as anhydrous potassium carbonate, sodium hydride or triethylamine and reducing the resulting nitrile intermediate with lithium aluminuim hydride to give the phenoxy (and pheynlthio) ethylamines.

Alternatively, the phenoxyethylamine starting materials are prepared by treating a phenol with chloroacetic acid to give the corresponding phenoxyacetic acid which is converted to the amide with ammonia, followed by reduction with lithium aluminum hydride to form the starting material.

Another method of preparing these starting materials is by reaction of the appropriate phenol or thiophenol with an alkylene dihalide followed by treatment of the resulting halo compound with potassium phthalimide. The resulting phthalimide derivative yields the amine starting material upon treatment with hydrazine.

The following examples are not limiting but will serve to illustrate the compounds of this invention and the process for their preparation.

*Example 1*

A mixture of 2,6-xylenol (244 g.), anhydrous potassium carbonate (260 g.) and methyl ethyl ketone (350 ml.) is stirred and boiled under reflux. A solution of chloroacetonitrile (140 ml.) in methyl ethyl ketone (150 ml.) is added during one hour, boiling and stirring being continued for a further hour. The bulk of the solvent is removed under water-pump vacuo and the residue diluted with ice water and extracted several times with ether. Distillation of the ether solution gives 2,6-xylyloxy-acetonitrile, B.P. 88–92° C. (0.5–1.0 mm.).

The 2,6-xylyloxyacetonitrile (242 g.) in dry ether (300 ml.) is added to a well stirred slurry of lithium aluminium hydride (75 g.) in dry ether (600 ml.). After addition, the mixture is stirred and heated under reflux for two hours. The mixture is cooled in an ice bath and stirred while wet ether (1000 ml.) is added dropwise, followed by water (4000 ml.). The mixture is filtered. The filtrate is washed with brine and exhaustively extracted with 2 N hydrochloric acid. The acid extracts are washed with ether-hydrochloric acid. The acid extracts are washed with ether-petroleum ether (1 liter), basified with 50% caustic soda solution and the base extracted into ether. Distillation of the extract under nitrogen gives 2-(2,6-xylyloxy)ethylamine as a colorless oil, B.P. 115° C. (6.5 mm.).

2-methylthio-2-imidazoline hydriodide (22.2 g.) is dissolved in dry ethanol (80 ml.), 2-(2,6-xylyloxy)-ethylamine (15 g.) is added and the mixture is refluxed for two hours. The solution is then concentrated and set aside at 0° C. for 48 hours. The resulting crystalline product is filtered and recrystallized twice from isopropanol ether, affording 2-[2-(2,6-xylyloxy)ethylamino]-2-imidazoline hydriodide, M.P. 116–119° C.

This hydriodide salt is treated with sodium ethoxide in ethanol to give 2-(2,6-xylyloxyethylamino)-2-imidazoline.

*Example 2*

A mixture of 12.2 g. of 2-methylthio-2-imidazoline hydriodide, 13.0 g. of phenoxyethylamine in 100 ml. of dry ethanol is heated at reflux for two hours. Working up as in Example 1 gives 2-phenoxyethylamino-2-imidazoline hydriodide.

The free base is obtained by treating the hydriodide salt with ethanolic sodium ethoxide to give 2-(2-phenoxy)ethylamino-2-imidazoline.

*Example 3*

To an ethanol solution of 6.1 g. of 2-methylthio-2-imidazoline hydriodide is added 9.0 g. of 2-(2,6-xylyloxy)propylamine. The resulting mixture is refluxed for three hours to give, after working up as in Example 1, 2-[2-(2,6-xylyloxy)-propylamine]-2-imidazoline hydriodide which is neutralized to give the free base.

Treatment of the free base with ethereal hydrogen chloride gives 2-[2-(2,6-xylyloxy)propylamino]-2-imidazoline hydrochloride.

*Example 4*

A mixture of 2,6-xylenol (122 g.) potassium carbonate (900 g.) and methyl ethyl ketone (1500 ml.) is boiled and stirred under reflux during the addition of trimethylene chlorbromide (950 g.). After the addition, the mixture is boiled and stirred for 48 hours, cooled, filtered and concentrated under reduced pressure. The residue is diluted with water, extracted with ether and the ether extracts washed with 10% caustic soda solution and water and the ether solution dried over potassium carbonate. Evaporation of the ether, followed by distillation of the residue gives 1-chloro-3-(2,6-xylyloxy)propane, B.P. 140–142° C./18 mm.

A solution of 1-chloro-3-(2,6-xylyloxy)propane (79.5 g.) potassium phthalimide (74.0 g.) and dimethylformamide (180 ml.) is heated at 120° C. for two hours, the mixture is then poured into ice water and the mixture left in the cold for 16 hours. The pale yellow solid formed is filtered, washed with water and dried, affording 3-(2,6-xylyloxy)propyl phthalimide, M.P. 90.5–92.5° C.

The phthalimide compound (113.6 g.) is dissolved in ethanol (500 ml.) and to the warm solution, hydrazine hydrate (57 ml.) is added. The solution is heated on the steam bath for 30 minutes, filtered and the solid washed with ethanol. The combined ethanol filtrates are concentrated in vacuo and filtered. The residual amine is converted to the hydrochloride salt with ethereal hydrogen chloride. Recrystallization from ethanol affords 3-(2,6-xylyloxy)propylamine hydrochloride, M.P. 206–207° C. The free base is obtained by neutralizing an aqueous solution of the hydrochloride salt.

A mixture of 6.1 g. of 2-methylthio-2-imidazoline hydriodide and 9.0 g. of 3-(2,6-xylyloxy)propylamine is refluxed in ethanol for two hours. The resulting mixture is worked up as in Example 1 to give 2-[3-(2,6-xylyloxy)propylamino]-2-imidazoline hydriodide.

*Example 5*

A mixture of sodium cyanide (13.35 g.) and dimethylsulfoxide (120 ml.) is heated with stirring to an internal temperature of 80° C. and 1-chloro-3-(2,6-xylyloxy)propane (496 g. see Example 4) is added over 20 minutes. After addition, the mixture is slowly heated to a temperature of 135° C. and maintained at this temperature for 10 minutes. After cooling, the mixture is diluted with water (300 ml.) and extracted three times with ether. The combined ether extracts are washed with water and 6 N hydrochloric acid (50 ml.) followed by two more water washings. The ether solution is then dried over calcium chloride, concentrated and distilled to give 1-cyano-3-(2,6-xylyloxy)propane, B.P. 104° C./0.5 mm.

The nitrile (39.5 g.) is reduced with lithium aluminium hydride (7.94 g.) in dry ether according to the method described in Example 1 to give 4-(2,6-xylyloxy)butylamine, B.P. 93–94° C. at 0.25 mm.

A mixture of 6.1 g. of 2-methylthio-2-imidazoline hydriodide and 10.0 g. of 4-(2,6-xylyloxy)butylamine in ethanol is refluxed for two hours and worked up as in Example 1 to give 2-[4-(2,6-xylyloxy)butylamino]-2-imidazoline hydriodide. Treating the salt with sodium ethoxide in ethanol gives 2-[4-(2,6-xylyloxy)butylamino]-2-imidazoline.

*Example 6*

Following the procedure of Example 1 and using in place of 2,6-xylenol the following phenols and thiphenols:

2,6-diethylphenol
2,6-diisopropylphenol
2,6-dimethylthiophenol
2,6-dichlorothiophenol
2-ethoxythiophenol
4-fluoroethiophenol
2,6-dibromophenol
2,6-dimethoxyphenol
3,4-dimethoxythiophenol
3,4-dichlorophenol
o-Cresol
4-methoxyphenol, and
2-bromophenol the following products are obtained as their hydriodide salts:

2-[2-(2,6-diethylphenoxy)ethylamino]-2-imidazoline
2-[2-(2,6-diisopropylphenoxy)ethylamino]-2-imidazoline
2-[2-(2,6-xylylthio)ethylamino]-2-imidazoline
2-[2-(2,6-dichlorophenylthio)ethylamino]-2-imidazoline
2-[2-(2-ethoxyphenylthio)ethylamino]-2-imidazoline
2-[2-(4-fluorophenylthio)ethylamino]-2-imidazoline
2-[2-(2,6-dibromophenoxy)ethylamino]-2-imidazoline
2-[2-(2,6-dimethoxyphenoxyl)ethylamino]-2-imidazoline
2-[2-(3,4-dimethoxyphenylthio)ethylamino]-2-imidazoline
2-[2-(3,4-dichlorophenoxy)ethylamino]-2-imidazoline
2-[2-(2-tolyoxy)ethylamino]-2-imidazoline
2-[2-(4-methoxyphenoxy)ethylamino]-2-imidazoline, and
2-[2-(2-bromophenoxy)ethylamino]-2-imidazoline, respectively.

What is claimed is:

1. A compound of the class consisting of a free base and its pharmaceutically acceptable, acid addition salts, the free base having the formula:

$$\underset{R_2}{\overset{R_1}{\phantom{X}}}\text{—Y—A—NH—C}\begin{smallmatrix}\text{N—CH}_2\\|\\\text{N—CH}_2\\\text{H}\end{smallmatrix}$$

in which:
Y is a member selected from the group consisting of oxygen and sulfur;
A is alkylene of 2 to 4 carbon atoms having at least 2 carbon atoms separating the hetero atoms to which it is attached; and
$R_1$ and $R_2$ are members selected from the group consisting of hydrogen, halogen, lower alkyl and lower alkoxy.

2. A compound having the formula:

$$\underset{R_2}{\overset{R_1}{\phantom{X}}}\text{—O—(CH}_2)_n\text{—NH—C}\begin{smallmatrix}\text{N—CH}_2\\|\\\text{N—CH}_2\\\text{H}\end{smallmatrix}$$

in which:
$R_1$ and $R_2$ are lower alkyl, and
$n$ is an integer of from 2 to 4.

3. A compound having the formula:
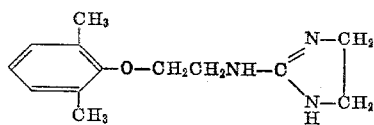
References Cited by the Examiner
UNITED STATES PATENTS
| | | | |
|---|---|---|---|
| 2,149,473 | 3/39 | Sonn | 260—309.6 |
| 2,899,426 | 8/59 | Bloom | 260—309.6 |
FOREIGN PATENTS
826,837  1/60  Great Britain.
OTHER REFERENCES
Abe: Chem. Abs. vol. 50, pages 1778(f–g) (1956).
Najero et al.: Bul. Soc. Chim. France, 1962, pages 556–9.
IRVING MARCUS, *Primary Examiner.*
NICHOLAS S. RIZZO, *Examiner.*